US010420363B2

(12) United States Patent
Hsiao

(10) Patent No.: US 10,420,363 B2
(45) Date of Patent: Sep. 24, 2019

(54) ROASTER

(71) Applicant: Han-Lin Hsiao, Taichung (TW)

(72) Inventor: Han-Lin Hsiao, Taichung (TW)

( * ) Notice: Subject to any disclaimer, the term of this patent is extended or adjusted under 35 U.S.C. 154(b) by 632 days.

(21) Appl. No.: 15/204,650

(22) Filed: Jul. 7, 2016

(65) Prior Publication Data

US 2017/0013870 A1 Jan. 19, 2017

(30) Foreign Application Priority Data

Jul. 14, 2015 (TW) .............................. 104122745 A

(51) Int. Cl.
A23N 12/12 (2006.01)
A23F 5/04 (2006.01)
A23N 12/08 (2006.01)

(52) U.S. Cl.
CPC .............. A23N 12/12 (2013.01); A23F 5/046 (2013.01); A23N 12/08 (2013.01)

(58) Field of Classification Search
CPC ......... A23F 5/046; A23N 12/08; A23N 12/12; A23L 1/00
USPC ................... 99/348, 450, 483, 476
See application file for complete search history.

(56) References Cited

U.S. PATENT DOCUMENTS

| 5,230,281 | A | * | 7/1993 | Wireman | .............. | F26B 17/107 34/58 |
| 6,112,644 | A | * | 9/2000 | Song | .................... | A23N 12/086 34/233 |
| 6,173,506 | B1 | * | 1/2001 | Kruepke | .............. | A23N 12/083 34/225 |
| 6,195,912 | B1 | * | 3/2001 | Moon | .................... | A23N 12/08 34/136 |
| 6,942,887 | B1 | * | 9/2005 | Freedman | .............. | A23N 12/08 34/576 |
| 2003/0061942 | A1 | * | 4/2003 | Erickson | .................. | A23F 5/04 99/348 |
| 2017/0013870 | A1 | * | 1/2017 | Hsiao | .................... | A23N 12/12 |

* cited by examiner

Primary Examiner — Dana Ross
Assistant Examiner — Joseph W Iskra
(74) Attorney, Agent, or Firm — Hamre, Schumann, Mueller & Larson, P.C.

(57) ABSTRACT

A roaster for roasting articles includes a containing device, an air supplying device, a first separating device, and a collector device. The containing device defines a roasting chamber. The air supplying device generates a heated air stream that flows into the roasting chamber. The first separating device has a shell unit disposed above the containing device, and a first separating member disposed in the shell unit and configured such that impurities which are carried along with the heated air stream are filtered out from the heated air stream. The collector device is connected to the shell unit for collecting the impurities filtered out from the heated air stream.

15 Claims, 6 Drawing Sheets

ROASTER

CROSS-REFERENCE TO RELATED APPLICATION

This application claims priority of Taiwanese Patent Application No. 104122745, filed on Jul. 14, 2015.

FIELD

The disclosure relates to a roaster, and more particularly to a roaster for roasting coffee beans or other beans or grains.

BACKGROUND

Referring to FIG. 1, a conventional coffee bean roaster 1, as disclosed in Taiwanese Patent Publication No. 201400036, includes a roasting module 11, a collector device 12 connected to the roasting module 11, and a heating module 13 connected to the roasting module 11 and for applying heat to the roasting module 11. The roasting module 11 includes a feed unit 112 and a roller 113 that defines a roasting chamber 111. The roasting chamber 111 has an exhaust opening 10. The collector device 12 has an inlet opening 121 that is in spatial communication with the exhaust opening 10, and an outlet opening 122. Heated air and chaff generated by roasting coffee beans exit the roasting chamber 111 through the exhaust opening 10 and enter into the collector device 12 through the inlet opening 121. The chaff is collected in the collector device 12 and the heated air flows out from the outlet opening 122.

However, the heated air undesirably heats the collector device 12 as the heated air passes through the inlet and outlet openings 121, 122, which makes replacement of the collector device 12 relatively difficult and inconvenient since the collector device 12 is too hot to be touched by hand during or immediately after a roasting operation.

SUMMARY

Therefore, an object of the disclosure is to provide a roaster that can alleviate at least the drawback of the prior art.

According to the disclosure, the roaster is for roasting articles. The roaster includes a base, a containing device, an air supplying device, a first separating device, and a collector device. The containing device is removably disposed on the base, and defines a roasting chamber that is adapted for receiving the articles therein and that has an upper end portion and a lower end portion. The air supplying device is disposed to generate a heated air stream that flows into the roasting chamber through the lower end portion for roasting the articles. The first separating device includes a shell unit and a first separating member. The shell unit is disposed above the containing device, and has an air stream inlet, an air stream outlet, and a discharge outlet. The air stream inlet is in spatial communication with the upper end portion of the roasting chamber. The air stream outlet is spaced apart from the air stream inlet. The discharge outlet is located between the air stream inlet and the air stream outlet. The first separating member is disposed in the shell unit between the air stream inlet and the air stream outlet, is located adjacent to the discharge outlet, and is configured in a way such that impurities, which are generated by roasting the articles and which are carried along with the heated air stream advanced from the roasting chamber into the shell unit, are filtered out from the heated air stream. The collector device is connected to the discharge outlet of the shell unit for collecting the impurities that are separated from the heated air stream.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
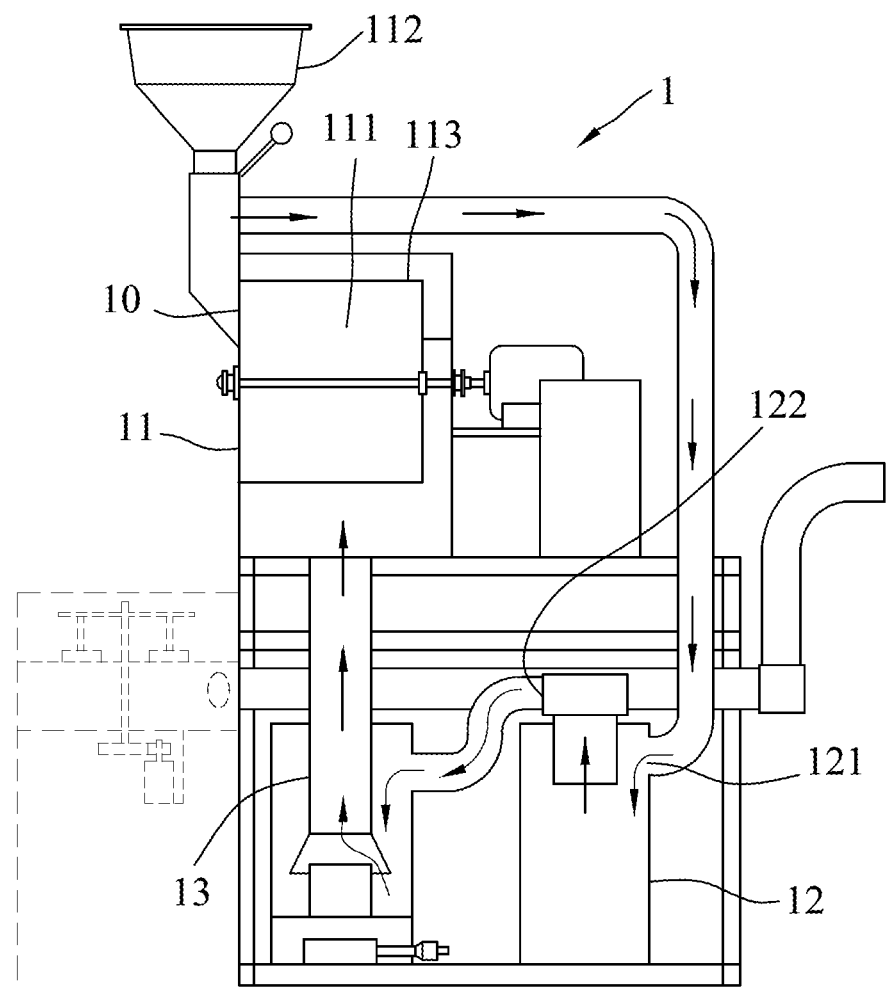
FIG. 1 is a schematic view of a conventional roaster as disclosed in Taiwanese Patent Publication No. 201400036.
Figure 2:
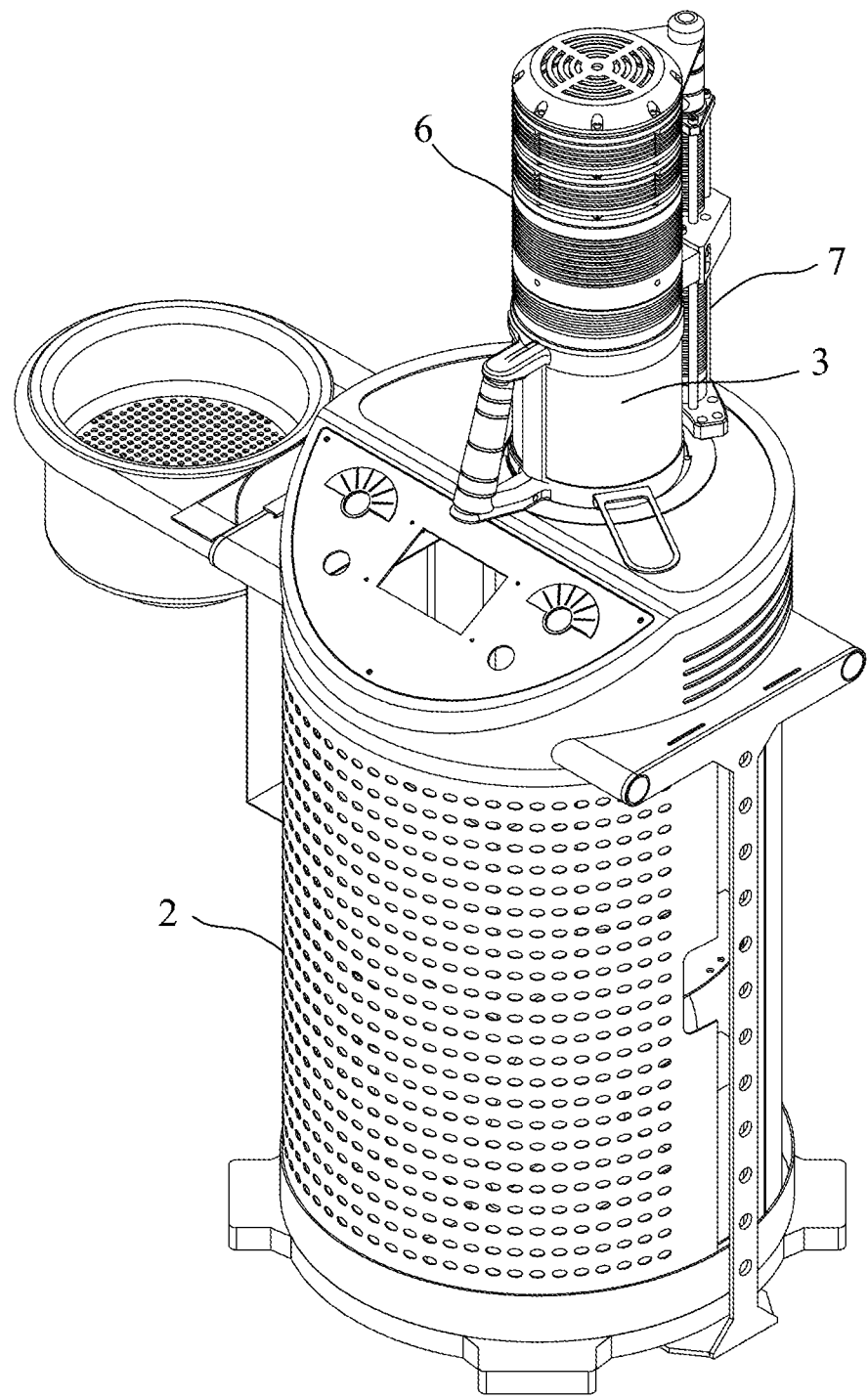
FIG. 2 is a perspective view of an embodiment of a roaster according to the disclosure.
Figure 3:
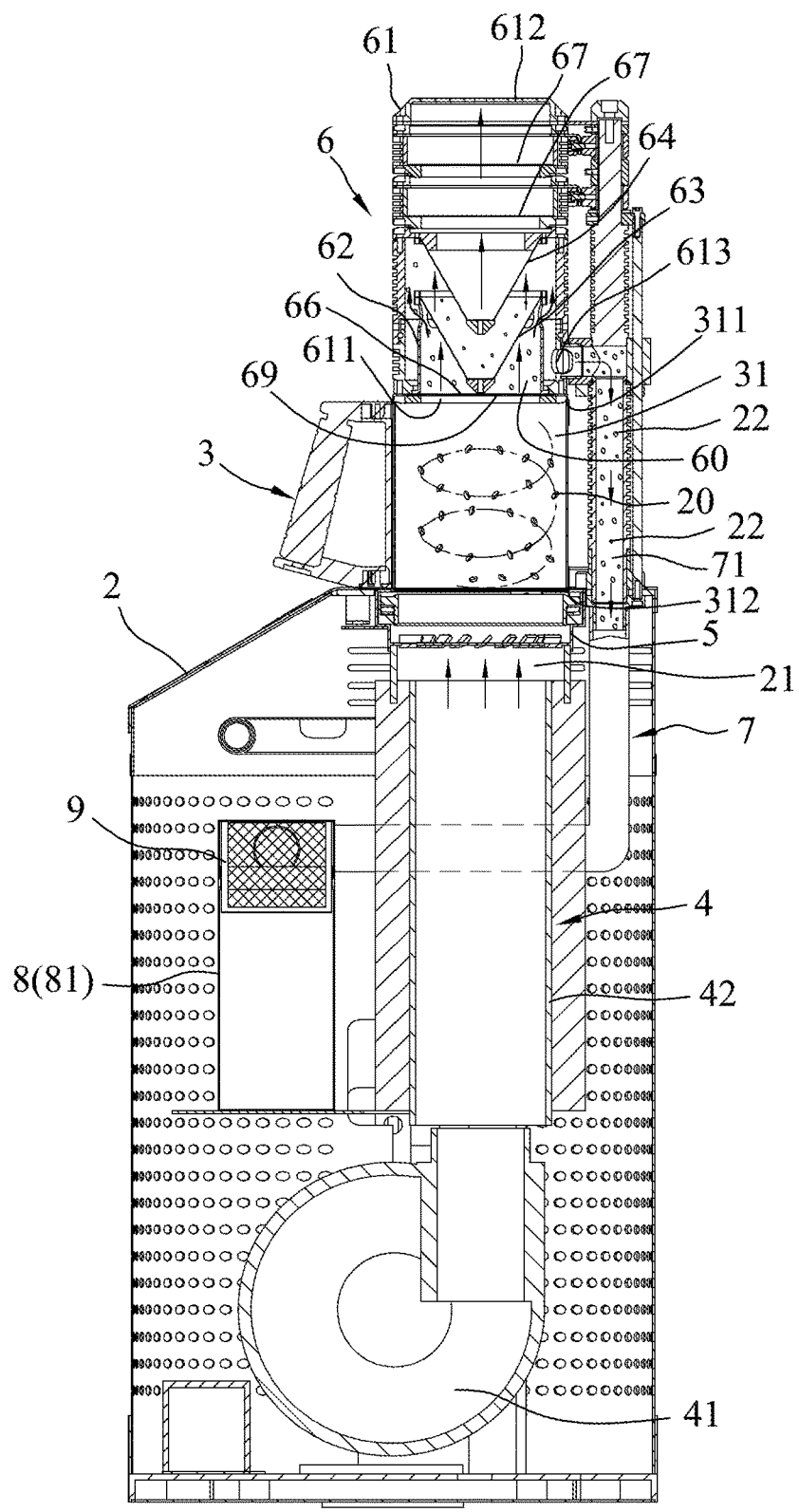
FIG. 3 is a sectional view of the embodiment illustrating that the embodiment is in use for roasting coffee beans.
Figure 4:
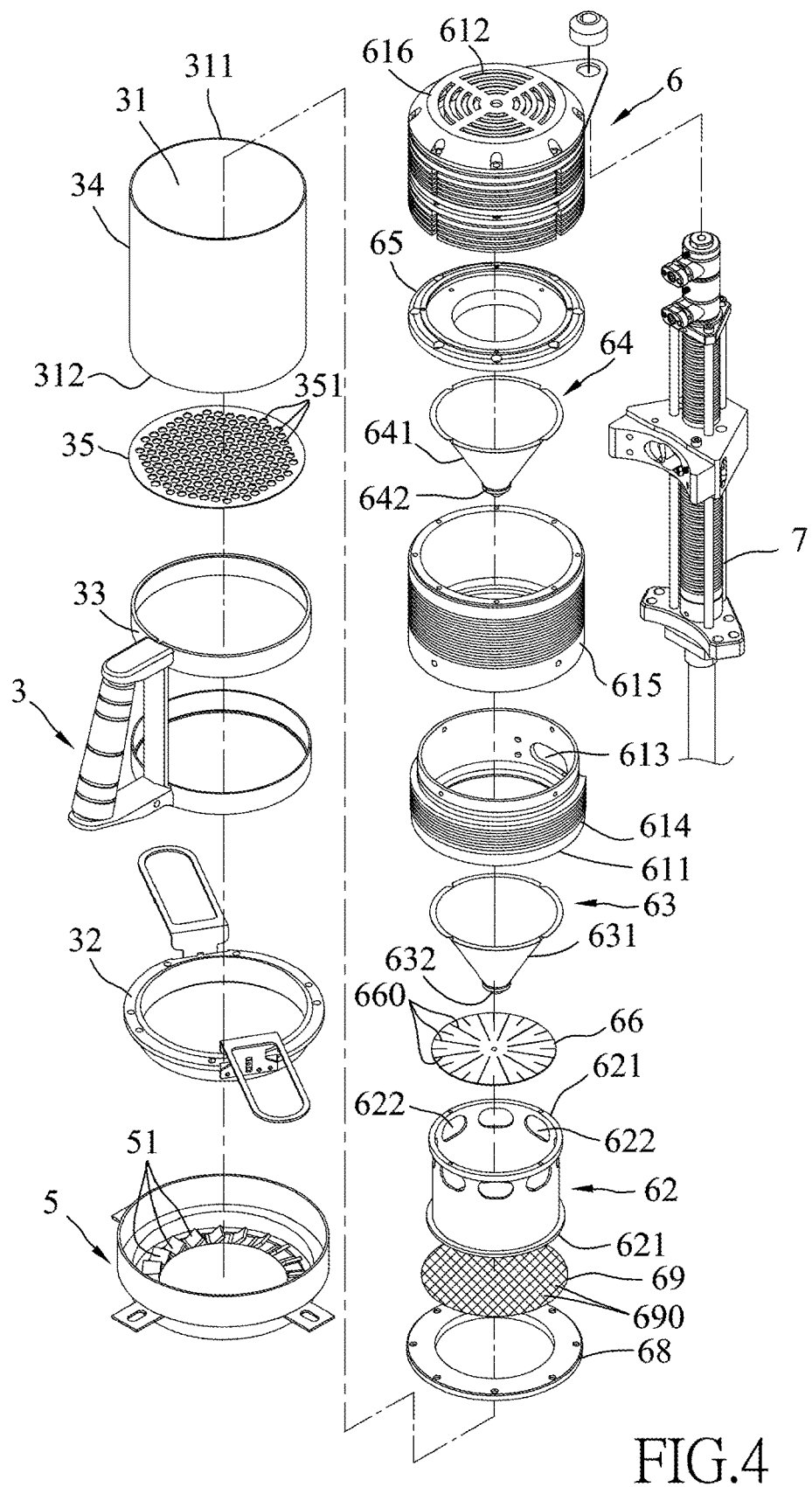
FIG. 4 is a fragmentary exploded perspective view of the embodiment, illustrating a containing device, a guide seat, a first separating device, and a connecting device.

Referring to FIGS. 2 to 4, an embodiment of a roaster according to the disclosure is for roasting articles 20, such as coffee beans, cocoa beans, grains, etc. The roaster includes a base 2, a containing device 3, an air supplying device 4, a guide seat 5, a first separating device 6, a connecting device 7, a collector device 8, and a second separating device 9.

The containing device 3 is removably disposed on the base 2, and defines a roasting chamber 31 that is adapted for receiving the articles 20 therein. As shown in FIG. 4, the containing device 3 includes a coupling seat 32, a support stand 33 coupled to the coupling seat 32, a cylinder body 34 disposed in the support stand 33, and a perforated plate 35 disposed under the cylinder body 34, being formed with a plurality of perforations 351, and for receiving a volume of the articles 20 thereon. The perforated plate 35 and the cylinder body 34 of the containing device 3 cooperatively define the roasting chamber 31, which has an upper end portion 311 and a lower end portion 312.

The air supplying device 4 is disposed in the base 2, and is disposed to generate a heated air stream 21 that flows into the roasting chamber 31 through the lower end portion 312 of the roasting chamber 31 for roasting the articles 20. In greater detail, the air supplying device 4 includes an air supply unit 41 and a heating unit 42. The air supply unit 41 is for supplying an air stream. The heating unit 42 is disposed above the air supply unit 41 and is for heating the air stream to generate the heated air stream 21. The air supply unit 41 is, for example but not limited to, a blower. The heating unit 42 is, for example but not limited to, a heater-type thermistor.

The guide seat 5 is disposed between the lower end portion 312 of the roasting chamber 31 and the air supplying device 4, and is configured for guiding flow of the heated air stream 21 for uniformly roasting the articles 20. The guide seat 5 includes a plurality of guide blades 51 circularly arranged and cooperatively guiding the heated air stream 21 to form a helical flow pattern so as to create a fluidized bed of the articles 20 in the roasting chamber 31 for uniformly roasting the articles 20. It should be noted that in other embodiments, arrangement of the guide blades 51 of the guide seat 5 may be modified for forming a different flow pattern.

The first separating device 6 includes a shell unit 61, a first separating member 63, a tubular member 62, a second separating member 64, a first ring plate 65, a second ring plate 68, a flexible cover member 66, a support plate 69, and two activated carbon filter elements 67.

The shell unit 61 is disposed above the containing device 3, and has an air stream inlet 611, an air stream outlet 612, and a discharge outlet 613. The air stream inlet 611 is in spatial communication with the upper end portion 311 of the roasting chamber 31. The air stream outlet 612 is spaced apart from the air stream inlet 611. The discharge outlet 613 is located between the air stream inlet 611 and the air stream outlet 612. The shell unit 61 is constituted by a first shell part 614 having the air stream inlet 611 and the discharge outlet 613, a second shell part 615, and a third shell part 616 having the air stream outlet 612. The second shell part 615 interconnects the first and third shell parts 614, 616.

The first separating member 63 is disposed in the shell unit 61 between the air stream inlet 611 and the air stream outlet 612, and is located adjacent to the discharge outlet 613. The first separating member 63 converges toward the containing device 3, and includes a main body 631 being frusto-conical in shape, such that impurities 22, which are generated by roasting the articles 20 and which are carried along with the heated air stream 21 advanced from the roasting chamber 31 into the shell unit 61, are filtered out from the heated air stream 21, and such that the heated air stream 21 with the impurities 22 removed exits the air stream outlet 612. The impurities 22 are mostly chaff separated from, for example, coffee beans during roasting. The first separating member 63 further includes a guide piece 632 connected to a bottom end of the main body 631, disposed above the air stream inlet 611, and configured for guiding the heated air stream 21 to flow along an outer surface of the main body 631 in an evenly distributed manner. The main body 631 of the first separating member 63 is, for example but not limited to, a metal mesh.

The tubular member 62 is disposed in the shell unit 61, has opposite top and bottom open ends 621, and retains the first separating member 63 therein. The tubular member 62 cooperates with the main body 631 of the first separating member 63 to define a passage space 60 (see FIG. 3), and is formed with a plurality of spaced-apart openings 622 that are proximate to a top end of the first separating member 63, and that communicate spatially with the passage space 60 and the discharge outlet 613, such that the impurities 22 are guided to flow from the passage space 60 to the discharge outlet 613 via the openings 622.

The second separating member 64 is disposed in the shell unit 61 between the first separating member 63 and the air stream outlet 612 for further filtering the heated air stream 21 advanced from the first separating member 63. The second separating member 64 is coupled to the first ring plate 65 (see FIG. 4) via a plurality of screws (not shown), and is connected to and received in the second shell part 615 of the shell unit 61. The second separating member 64 converges toward the containing device 3, and includes a main body 641 being frusto-conical in shape, and a guide piece 642 connected to a bottom end of the main body 641 of the second separating member 64. The guide piece 642 of the second separating member 64 is disposed above the guide piece 632 of the first separating member 63, and is configured for guiding the heated air stream 21 which passes through the first separating member 63 to flow along an outer surface of the main body 641 of the second separating member 64 in an evenly distributed manner. The main body 641 of the second separating member 64 is, for example but not limited to, a metal mesh with a mesh size smaller than that of the main body 631 of the first separating member 63.

The cover member 66 is disposed between a bottom end of the first separating member 63 and the air stream inlet 611, is formed with a plurality of slits 660 that radiate from a center region of the cover member 66. In this embodiment, the cover member 66 is coupled to the guide piece 632 of the first separating member 63 via a screw (not shown) extending through the cover member 66 and the guide piece 632 of the first separating member 63. The cover member 66 is, for example but not limited to, a piece of paper.

The support plate 69 is disposed on the second ring plate 68, is located between the cover member 66 and the air stream inlet 611, and is formed with a plurality of through holes 690 through which the heated air stream 21 enters into the shell unit 61. The support plate 69 is disposed to prevent the cover member 66 from falling down into the roasting chamber 31.

The activated carbon filter elements 67 are disposed in the shell unit 61 between the air stream outlet 612 and the second separating member 64, and are vertically spaced apart from each other. The activated carbon filter elements 67 are disposed to remove odor of the heated air stream 21.

Figure 5:
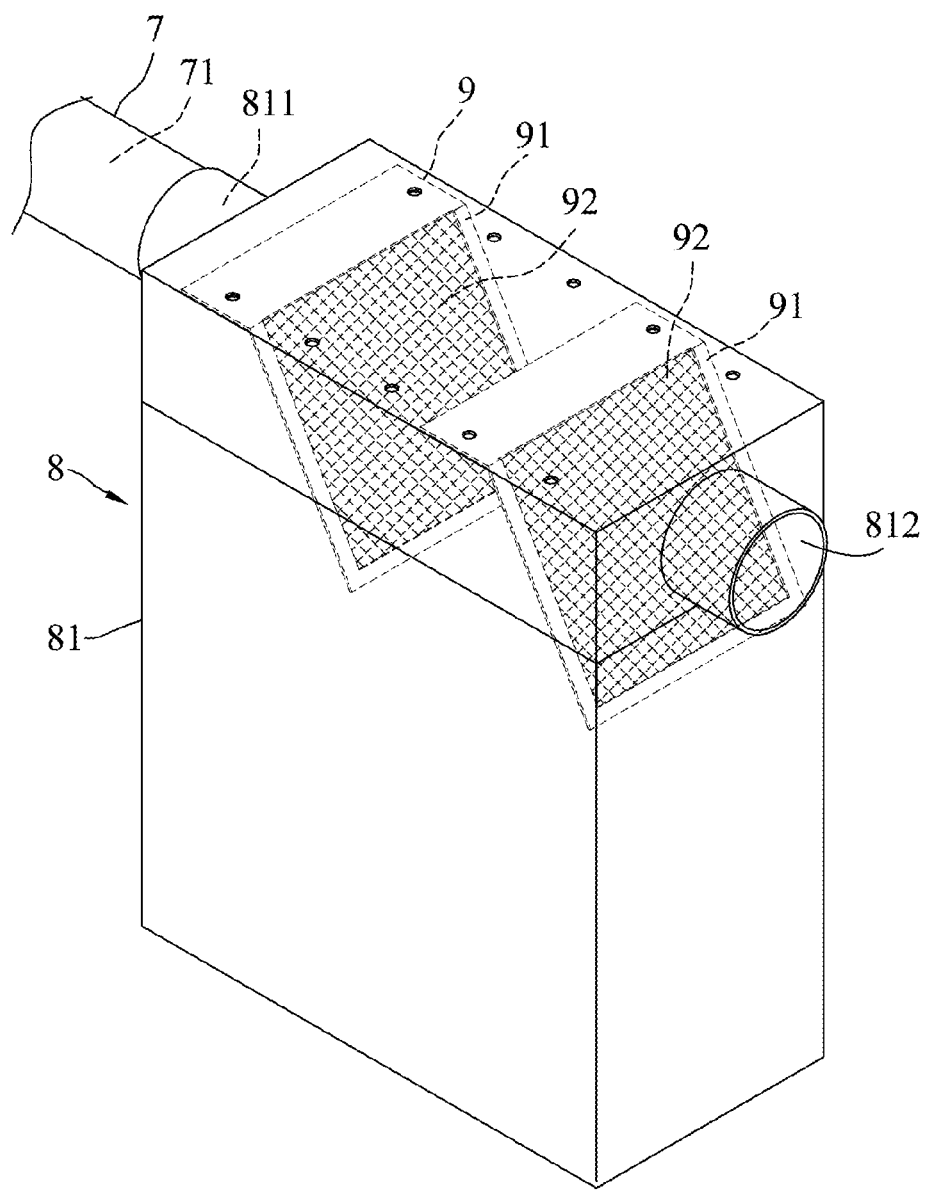
FIG. 5 is a perspective view illustrating a collector device and a second separating device of the embodiment.

Referring to FIGS. 3 and 5, the connecting device 7 is mounted to the base 2, and defines a conduit 71 that interconnects the discharge outlet 613 of the shell unit 61 and the collector device 8.

The collector device 8 is for collecting the impurities 22 that are separated from the heated air stream 21, and includes a casing 81 that is disposed in the base 2 and that is for receiving the impurities 22 separated by the first separating device 6. The casing 81 has an inlet opening 811 connected to the conduit 71 of the connecting device 7 (such that the inlet opening 811 communicates with the discharge outlet 613 of the shell unit 61 via the connecting device 7), and an outlet opening 812 opposite to the inlet opening 811.

The second separating device 9 is disposed in the casing 81, and includes two spaced-apart frames 91 and two filter members 92. The frames 91 are connected to the casing 81 and are disposed adjacent to the inlet and outlet openings 811, 812, respectively. The filter members 92 are respectively disposed in the frames 91 for preventing the impurities 22 from exiting the outlet opening 812. In this way, the impurities 22 are effectively collected in the casing 81. Each of the filter members 92 is, for example but not limited to, a screen mesh or a piece of filter paper. In this embodiment, each of the filter members 92 is a screen mesh.

During operation, the air supplying device 4 generates the heated air stream 21 that flows upwardly, and the cover member 66 is deformed by the flow of the heated air stream 21 and is attached to the outer surface of the main body 631 of the first separating member 63 so as to permit the heated air stream 21 to flow into the shell unit 61 through the air stream inlet 611. At this time, with the size of the cover member 66 being specifically designed such that a part of the first separating member 63 is not covered by the cover member 66, a part of the heated air stream 21 is permitted to directly flow upward through the uncovered part of the first separating member 63.

As the heated air stream 21 flows upwardly and contacts the first separating member 63, another part of the heated air stream 21 flows along an outer surface of the main body 631 of the first separating member 63, and moves the impurities 22 upwardly and outwardly toward the openings 622 of the tubular member 62. In this way, the impurities 22 are prevented from accumulating on the outer surface of the main body 631 of the first separating member 63. As the part of the heated air stream 21 which passes through the first separating member 63 continues to flow upwardly and contacts the second separating member 64, a portion of the heated air stream 21 flows along an outer surface of the main body 641 of the second separating member 64, so that the impurities 22 which are not separated by and passes through the first separating member 63 move upwardly and outwardly, and are prevented from accumulating on the outer surface of the main body 641 of the second separating member 64. In this way, the heated air stream 21 with the impurities 22 removed by the first and second separating members 63, 64 can continue to flow upwardly and exit the roaster through the air stream outlet 612.

When the air supplying device 4 stops generating the heated air stream 21, the cover member 66 restores to cover the air stream inlet 611 so as to prevent the impurities 22 carried along with the heated air stream 21 to fall down into the roasting chamber 31.

In summary, by virtue of the first separating device 6, the impurities 22 are separated from the heated air stream 21 before the heated air stream 21 exits the roaster through the air stream outlet 612, thereby effectively preventing the impurities 22 from becoming airborne particles which pollute the environment. Moreover, compared to the abovementioned conventional roaster 1, the impurities 22 can be collected more effectively using the roaster of the disclosure, and the collector device 8 can be removed or replaced without concerning that the collector device 8 may be too hot to be touched by hand. In addition, the configuration of the guide seat 5 permits uniform roasting of the articles 20 in the roasting chamber 31. Since the guide seat 5 and the containing device 3 are separate components of the roaster, the guide seat 5 can be replaced easily and conveniently when it is desired to form a different flow pattern.

Figure 6:
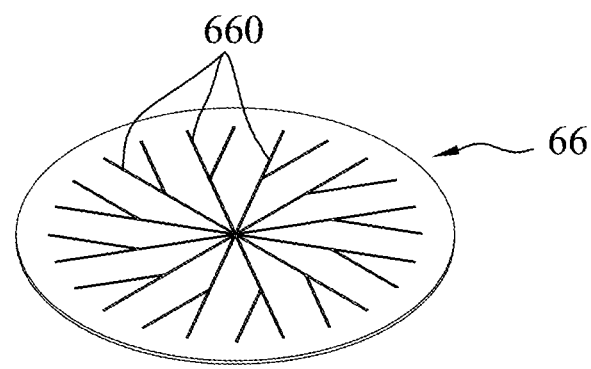
FIG. 6 is a perspective view of a modification of a cover member of the first separating device of the embodiment.

Referring to FIG. 6, in a modification of the embodiment, the slits 660 of the cover member 66 intersect at a center of the cover member 66. The cover member 66 is stably disposed in between the tubular member 62 and the support plate 69 (see FIG. 4). When the air supplying device 4 generates the heated air stream 21, the cover member 66 is deformed by the flow of the heated air stream 21 through the center of the cover member 66 so as to permit the heated air stream 21 to flow into the shell unit 61.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A roaster for roasting articles, said roaster comprising:
a base;
a containing device removably disposed on said base, and defining a roasting chamber that is adapted for receiving the articles therein and that has an upper end portion and a lower end portion;
an air supplying device disposed to generate a heated air stream that flows into said roasting chamber through said lower end portion for roasting the articles;
a first separating device including
a shell unit that is disposed above said containing device, and that has an air stream inlet being in spatial communication with said upper end portion of said roasting chamber, an air stream outlet being spaced apart from said air stream inlet, and a discharge outlet located between said air stream inlet and said air stream outlet, and
a first separating member that is disposed in said shell unit between said air stream inlet and said air stream outlet, that is located adjacent to said discharge outlet, and that is configured in a way such that impurities, which are generated by roasting the articles and which are carried along with the heated air stream advanced from said roasting chamber into said shell unit, are filtered out from the heated air stream;
a collector device connected to said discharge outlet of said shell unit for collecting the impurities that are separated from the heated air stream, said collector device including a casing that is disposed in said base, that is for receiving the impurities separated by the first separating device, and that has an outlet opening; and
a second separating device that is disposed in said casing, and that prevents the impurities from exiting said outlet opening.

2. The roaster as claimed in claim 1, wherein said first separating member converges toward said containing device.

3. A roaster for roasting articles, said roaster comprising:
a base;
a containing device removably disposed on said base, and defining a roasting chamber that is adapted for receiving the articles therein and that has an upper end portion and a lower end portion;
an air supplying device disposed to generate a heated air stream that flows into said roasting chamber through said lower end portion for roasting the articles;
a first separating device including
a shell unit that is disposed above said containing device, and that has an air stream inlet being in spatial communication with said upper end portion of said roasting chamber, an air stream outlet being spaced apart from said air stream inlet, and a discharge outlet located between said air stream inlet and said air stream outlet, and
a first separating member that is disposed in said shell unit between said air stream inlet and said air stream outlet, that is located adjacent to said discharge outlet, and that is configured in a way such that impurities, which are generated by roasting the articles and which are carried along with the heated air stream advanced from said roasting chamber into said shell unit, are filtered out from the heated air stream; and a collector device connected to said discharge outlet of said shell unit for collecting the impurities that are separated from the heated air stream wherein said first separating member converges toward said containing device, and wherein said first separating member includes a main body being frusto-conical in shape.

4. The roaster as claimed in claim 3, wherein said first separating member further includes a guide piece connected to a bottom end of said main body of said first separating member, disposed above said air stream inlet, and configured for guiding the heated air stream to flow along an outer surface of said main body in an evenly distributed manner.

5. The roaster as claimed in claim 4, wherein said first separating device further includes a tubular member that is disposed in said shell unit, that has opposite top and bottom open ends, and that retains said first separating member therein, said tubular member cooperating with said first separating member to define a passage space, and being formed with a plurality of spaced-apart openings that are proximate to a top end of said first separating member and that communicate spatially with said passage space and said discharge outlet, such that the impurities are guided to flow from said passage space to said discharge outlet via said openings.

6. The roaster as claimed in claim 5, wherein said first separating device further includes a second separating member that is disposed in said shell unit between said first separating member and said air stream outlet for further filtering the heated air stream advanced from the first separating member.

7. The roaster as claimed in claim 6, wherein said second separating member converges toward said containing device.

8. The roaster as claimed in claim 7, wherein said second separating member includes a main body being frusto-conical in shape.

9. The roaster as claimed in claim 8, wherein said second separating member further includes a guide piece connected to a bottom end of said main body of said second separating member, disposed above said guide piece of said first separating member, and configured for guiding the heated air stream which passes through said first separating member to flow along an outer surface of said main body of said second separating member in an evenly distributed manner.

10. The roaster as claimed in claim 9, wherein:
said first separating device further includes a flexible cover member that is disposed between a bottom end of said first separating member and said air stream inlet;
when said air supplying device generates the heated air stream, said cover member is deformed by the flow of the heated air stream so as to permit the heated air stream to flow into said shell unit; and
when said air supplying device stops generating the heated air stream, said cover member restores to cover said air stream inlet so as to prevent the impurities carried along with the heated air stream to fall down into said roasting chamber.

11. The roaster as claimed in claim 10, wherein said cover member is formed with a plurality of slits that radiate from a center region of said cover member.

12. The roaster as claimed in claim 11, wherein said slits intersect at a center of said cover member.

13. The roaster as claimed in claim 1, further comprising a guide seat disposed between said lower end portion of said roasting chamber and said air supplying device, and configured for guiding flow of the heated air stream for uniformly roasting the articles.

14. The roaster as claimed in claim 1, wherein said air supplying device is disposed in said base, and includes an air supply unit for supplying an air stream, and a heating unit for heating the air stream to generate the heated air stream.

15. The roaster as claimed in claim 1, further comprising a connecting device defining a conduit that interconnects said discharge outlet of said shell unit and said collector device.

* * * * *